United States Patent
Jeong et al.

(10) Patent No.: US 11,085,526 B2
(45) Date of Patent: Aug. 10, 2021

(54) SHIFT LEVER APPARATUS FOR VEHICLE

(71) Applicants: HYUNDAI MOTOR COMPANY, Seoul (KR); KIA MOTORS CORPORATION, Seoul (KR); SL Corporation, Daegu (KR)

(72) Inventors: Won Jin Jeong, Hwaseong-si (KR); Jin Yong Kim, Busan (KR)

(73) Assignees: HYUNDAI MOTOR COMPANY, Seoul (KR); KIA MOTORS CORPORATION, Seoul (KR); SL CORPORATION, Daegu (KR)

( * ) Notice: Subject to any disclaimer, the term of this patent is extended or adjusted under 35 U.S.C. 154(b) by 0 days.

(21) Appl. No.: 16/745,009

(22) Filed: Jan. 16, 2020

(65) Prior Publication Data

US 2021/0041020 A1 Feb. 11, 2021

(30) Foreign Application Priority Data

Aug. 8, 2019 (KR) .......................... 10-2019-0096485

(51) Int. Cl.
| | |
|---|---|
| *B60K 20/00* | (2006.01) |
| *F16H 59/02* | (2006.01) |
| *G05G 1/04* | (2006.01) |
| *F16H 59/10* | (2006.01) |
| *B60K 20/02* | (2006.01) |
| *G05G 1/06* | (2006.01) |

(52) U.S. Cl.
CPC ............. *F16H 59/10* (2013.01); *B60K 20/02* (2013.01); *F16H 59/0278* (2013.01); *G05G 1/06* (2013.01); *F16H 2059/0269* (2013.01)

(58) Field of Classification Search
CPC .......... F16H 59/0278; F16H 2059/026; F16H 2059/0265; F16H 2059/0269; F16H 59/10; B60K 20/02; B60K 20/04; G05G 1/04; G05G 1/06
See application file for complete search history.

(56) References Cited

U.S. PATENT DOCUMENTS

| | | | | |
|---|---|---|---|---|
| 5,398,565 | A | * | 3/1995 | Brock ...................... F16H 61/24 74/473.33 |
| 9,470,306 | B2 | * | 10/2016 | Ikegami .................. F16H 59/04 |
| 10,865,874 | B2 | * | 12/2020 | Haller ...................... G05G 1/04 |
| 2003/0213326 | A1 | * | 11/2003 | Fett ......................... F16H 59/04 74/473.3 |
| 2014/0053674 | A1 | | 2/2014 | Dominguez et al. |

FOREIGN PATENT DOCUMENTS

| | | | | | |
|---|---|---|---|---|---|
| EP | 0743475 | A1 | * | 11/1996 | ........... F16H 59/042 |
| JP | 2009234561 | A | * | 10/2009 | ............. F16H 59/10 |
| JP | 2012-076601 | A | | 4/2012 | |
| WO | WO-2005005867 | A1 | * | 1/2005 | ........... F16H 59/042 |

* cited by examiner

*Primary Examiner* — Adam D Rogers
(74) *Attorney, Agent, or Firm* — Brinks Gilson & Lione

(57) ABSTRACT

A shift lever apparatus for a vehicle moves a center point of rotation of a shift knob upward such that a height of the shift knob exposed to a console and an operating stroke of the shift knob are reduced, and a console size is decreased. The shift lever apparatus allows a manipulation direction of the shift knob is the same as an operational direction of a transmission cable, and thus a connection structure of an existing transmission may be maintained.

7 Claims, 14 Drawing Sheets

FIG. 14

SHIFT LEVER APPARATUS FOR VEHICLE

CROSS REFERENCE TO RELATED APPLICATION

This application claims priority to and the benefit of Korean Patent Application No. 10-2019-0096485, filed Aug. 8, 2019, the entire contents of which are incorporated herein by reference.

FIELD

The present disclosure relates to a shift lever apparatus for a vehicle to reduce a console size and improving a degree of freedom for a design.

BACKGROUND

The statements in this section merely provide background information related to the present disclosure and may not constitute prior art.

In a conventional automatic transmission vehicle, shift stages P, R, N, and D are generally arranged linearly, and a shift lever is rotated so that one of the shift stages can be selected. At this time, when the shift lever rotates, the cable is pulled and operating force thereof is transmitted to the transmission.

That is, because the point where the cable is connected to the shift lever is spaced upward from a center point of rotation of the shift lever, when the shift lever is rotated, the operating force is transmitted to the transmission by pulling or releasing the cable according to the rotation angle. Accordingly, the transmission recognizes the operating force transmitted thereto, and shifting in the shift stages is performed.

On the other hand, the conventional shift lever extends vertically long and forms a structure that is rotated by being connected by a hinge to a lower end and forms a structure to which the transmission cable is connected. However, we have discovered that the conventional shift lever has a problem that an amount of manipulation of the shift lever is increased as the center point of rotation is located at a lower end, and an amount of an opening of the console cover is increased to accommodate the amount of the rotation of the shift lever, thereby acting as an element of design constraint.

The foregoing matters described as the background art are intended merely to aid in the understanding of the background of the present disclosure, and should not be taken as acknowledging that the present disclosure falls within the purview of the related art that is already known to those skilled in the art.

SUMMARY

The present disclosure provides a shift lever apparatus for a vehicle that moves a center point of rotation of a shift knob upward, whereby a height of the shift knob exposed to a console and an operating stroke of the shift knob are reduced and allowing a manipulation direction of the shift knob and an operational direction of a transmission cable to be matched.

In one form of the present disclosure, the shift lever apparatus for the vehicle include: a shift know connected to a shift lever rotatably installed in a lever body, where the shift lever has a center point of rotation at an upper portion of the shift lever; and an engaging lever installed in the lever body and configured to rotate along with the shift lever coupled to the engaging lever. In particular, the engaging lever is connected to a transmission cable and configured to rotate in a direction opposite to an manipulation direction of the shift lever when rotated, such that the manipulation direction of the shift lever is the same as an operational direction of the transmission cable.

In one form, the shift lever and the engaging lever may be connected through a connecting portion configured to simultaneously perform a rotational movement and a sliding movement.

In another form, the connecting portion may include: a guide part provided with a slit hole extending in a straight line and a guide pin rotatably inserted into the slit hole, wherein the guide part and the guide pin are provided on the shift lever and the engaging lever, respectively, and the shift lever and the engaging lever are connected by the guide part and the guide pin.

The guide pin may include a body portion fixed to the shift lever or the engaging lever and a ball part extending from the body portion and inserted into the slit hole.

In other form, the guide pin may further include: a cap part configured to surround the ball part and slide into the slit hole along with the ball part in a state in close contact with the slit hole.

In still other form, the shift knob may be connected to the shift lever at a first portion located upper than the center point of rotation, and the engaging lever may be connected to the shift lever at a second portion located lower than the center point of rotation.

In another aspect of the present disclosure, the engaging lever may include: an intermediate portion rotatably installed in the lever body; a first end portion extended from the intermediate portion toward an upper side of the engaging lever, where the first end portion may be connected to the shift lever; and a second end portion extended from the intermediate portion toward a lower side of the engaging lever, where the second end portion is connected to the transmission cable.

The shift knob may be provided with a round cover that may be rotated along with the shift lever, and the round cover may be bent with a radius corresponding to a rotational radius of the shift lever.

The round cover may have: a cover shape surrounding a top end of the shift lever and may be provided with a fastening portion to which the shift knob may be coupled; and protrusions extending along curved portions formed on opposite sides of the round cover.

In one form of the present disclosure, a bezel disposed at an upper portion of the round cover may be provided on a top side of the lever body, the bezel being provided with a bent portion extending toward an inward side of the protrusion of the round cover, and the bent portion is spaced apart from a top surface and the protrusion of the round cover.

The shift knob may be connected so as to traverse a center line of rotation of the shift lever vertically at the right angle.

Accordingly, the shift lever apparatus for the vehicle having the structure as described above moves the center point of rotation of the shift knob upward, whereby the height of the shift knob exposed to the console and the operating stroke of the shift knob are reduced, thereby reducing the console size, and allows the manipulation direction of the shift knob and the operational direction of the transmission cable to be matched, whereby a connection structure of the existing transmission can be maintained.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinbelow, exemplary embodiments of the present disclosure will be described in detail with reference to the accompanying drawings.

Figure 1:
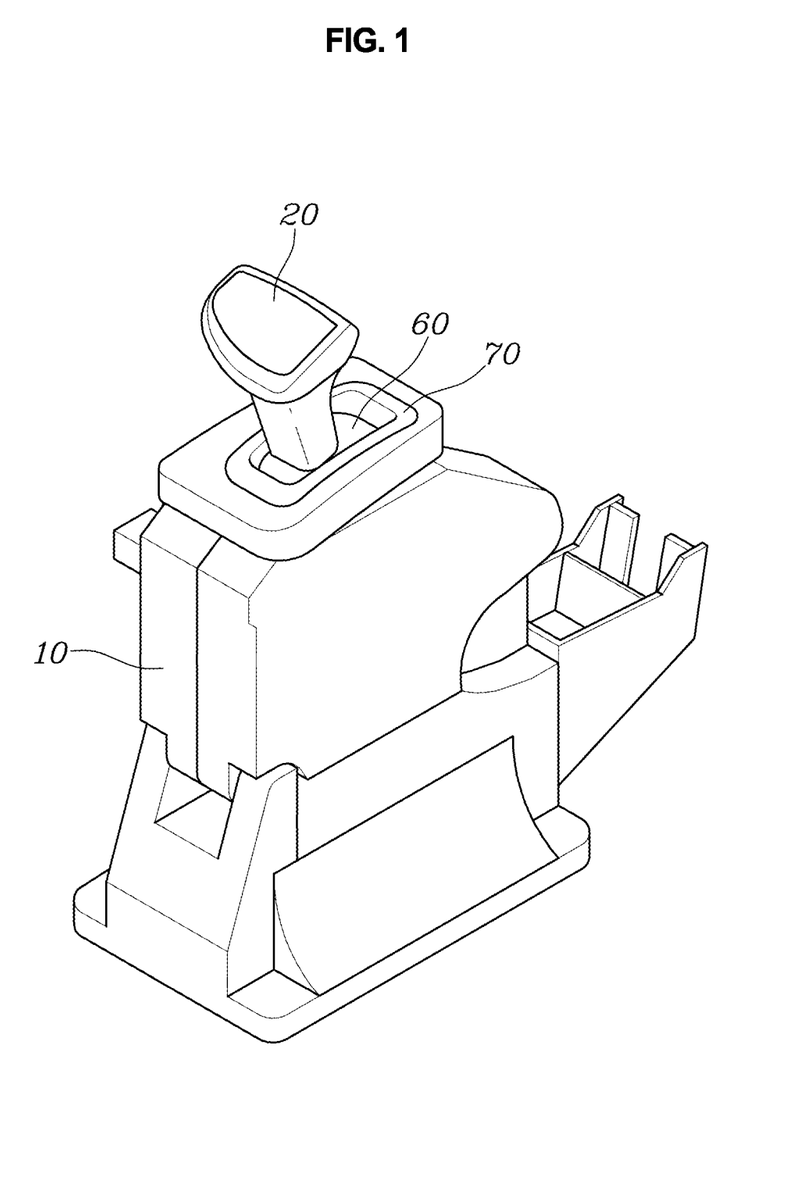
FIG. 1 is a view showing a shift lever apparatus for a vehicle according to an embodiment of the present disclosure.
Figure 2:
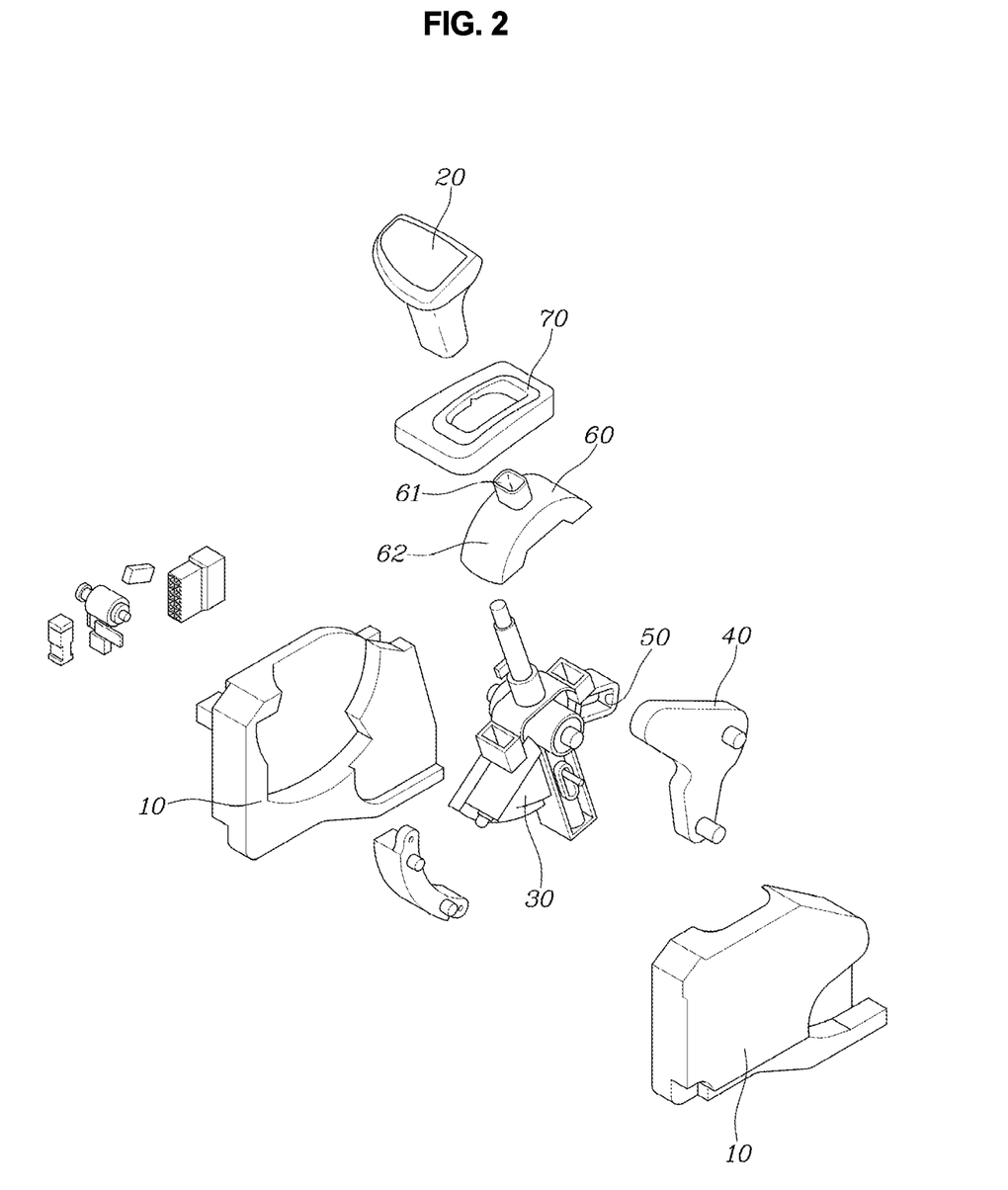
FIG. 2 is an assembly view of the shift lever apparatus for the vehicle shown in FIG. 1.
Figure 3:
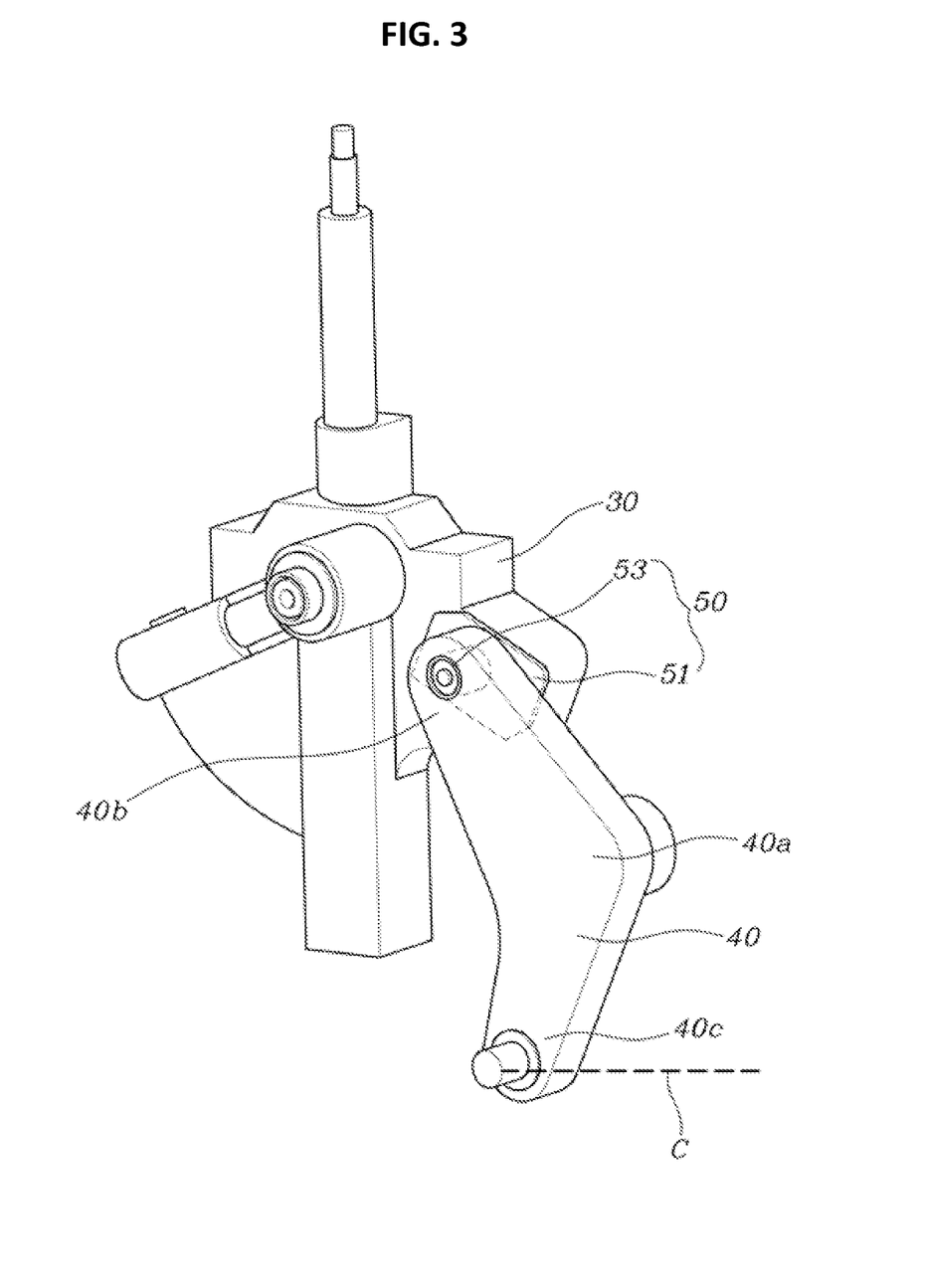
FIGS. 3 to 4 are views illustrating connection of the shift lever and the engaging lever to each other of the shift lever apparatus for the vehicle shown in FIG. 1.
Figure 4:
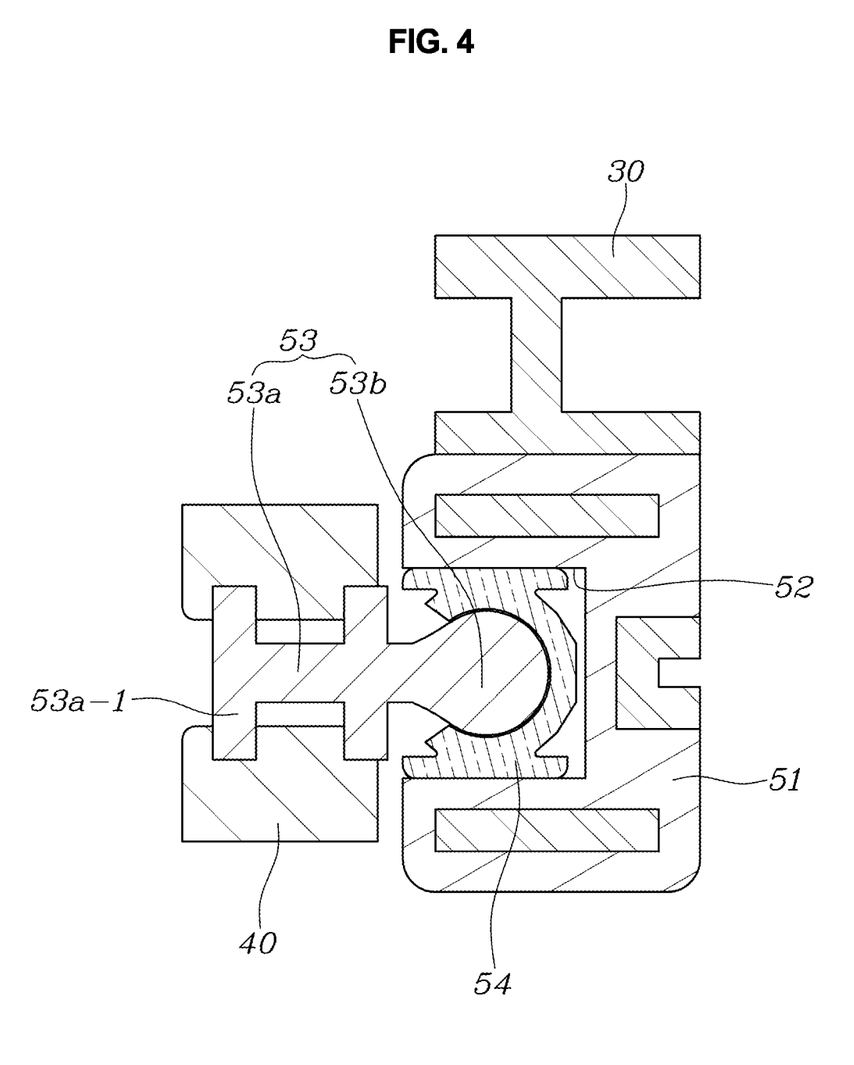
Figure 11:
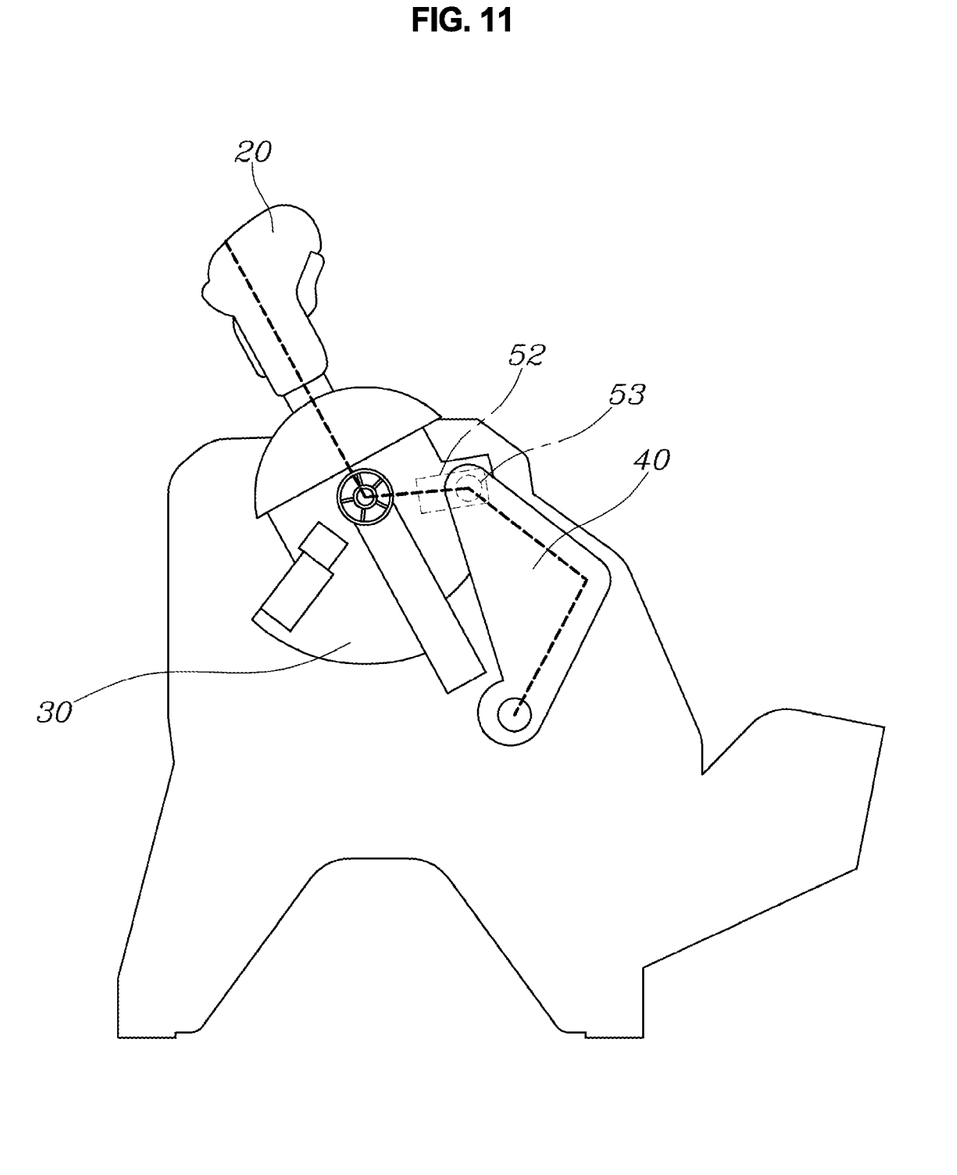
Figure 12:
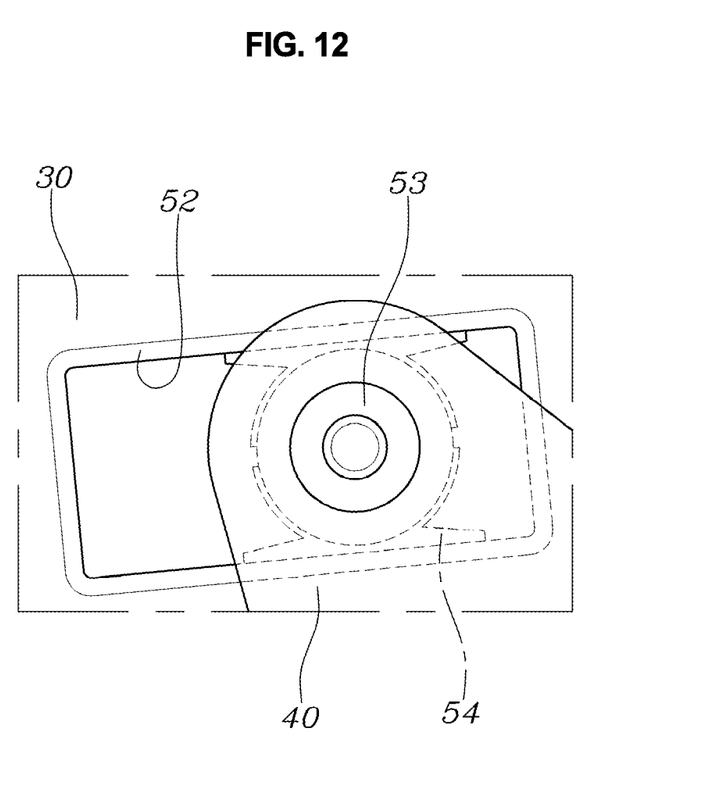
Figure 13:
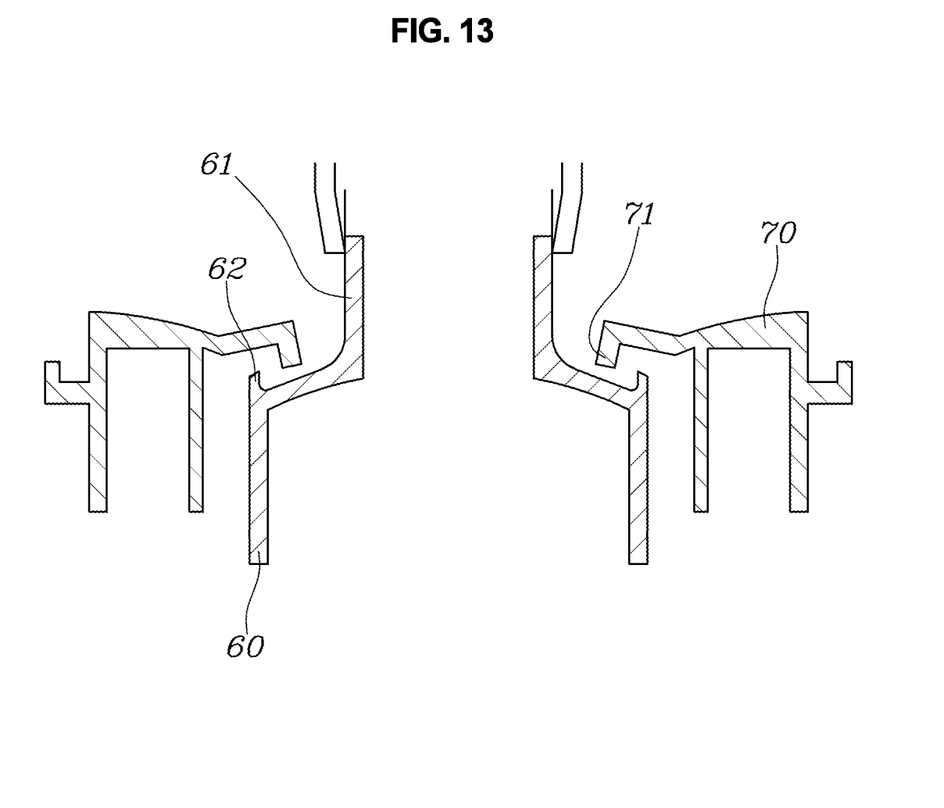
FIG. 13 is a view illustrating a round cover of the shift lever apparatus for the vehicle shown in FIG. 1.
Figure 14:
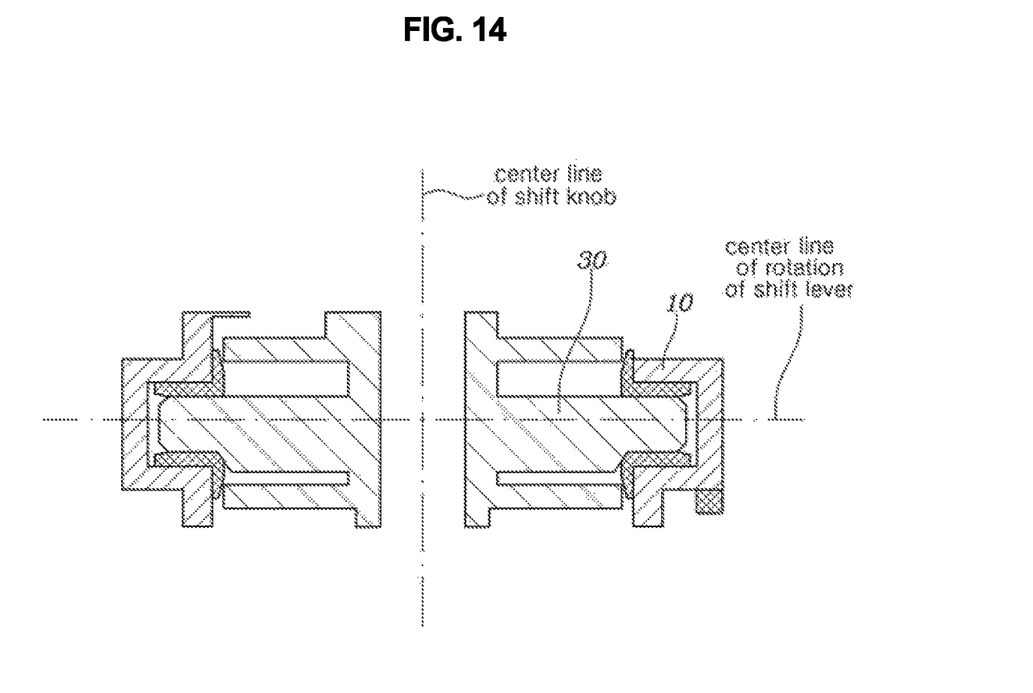
FIG. 14 is a view illustrating a connection structure of the shift lever of the shift lever apparatus for the vehicle shown in FIG. 1.

FIG. 1 is a view showing a shift lever apparatus for a vehicle according to an embodiment of the present disclosure, FIG. 2 is an assembly view of the shift lever apparatus for the vehicle shown in FIG. 1, FIGS. 3 to 4 are views illustrating connection of the shift lever and the engaging lever to each other of the shift lever apparatus for the vehicle shown in FIG. 1, FIGS. 5 to 12 are views illustrating the operating states of the shift lever apparatus for the vehicle shown in FIG. 1, FIG. 13 is a view illustrating a round cover of the shift lever apparatus for the vehicle shown in FIG. 1, and FIG. 14 is a view illustrating a connection structure of the shift lever of the shift lever apparatus for the vehicle shown in FIG. 1.

As shown in FIGS. 1 to 3, the shift lever apparatus for the vehicle includes: a shift lever 30 having a shift knob 20 connected thereto, rotatably installed in a lever body 10, and having a center point of rotation at an upper portion thereof; and an engaging lever 40 installed in the lever body 10 to rotate along with the shift lever 30 by being coupled thereto, having a transmission cable C connected thereto, and rotating in a direction opposite to the shift lever 30 when rotated, thereby allowing the manipulation direction of the shift lever 30 and the operational direction of the transmission cable to be matched.

The shift lever 30 and the engaging lever 40 are rotatably installed in the lever body 10, the shift knob 20 is connected to the shift lever 30, and the transmission cable C is connected to the engaging lever 40. Accordingly, when the shift lever 30 is rotated by the manipulation of the shift knob 20, the engaging lever 40 connected to the shift lever 30 is rotated, whereby pulling force is applied to the transmission cable C.

Here, the lever body 10 may be configured in two separated parts, and the detent structure may be applied to the shift lever 30.

In particular, the shift lever 30 is rotatably installed in the lever body 10 so as to have the center point of rotation at the upper portion, whereby, a height, exposed to the upper side of the lever body 10, of the shift knob 20 connected to the shift lever 30 is reduced, and the shift stroke of the shift knob 20 is also reduced. As a result, the size of the opening through which the shift knob 20 passes in the lever body 10 is reduced, thereby reducing the size of the console, thereby improving the degree of freedom for an interior design.

That is, in the related art, because the center point of rotation of the shift lever 30 is located at the lowest end in the linear direction of the shift lever, there is a problem that the shift stroke of the shift lever is increased. However, in the present disclosure, because the center point of rotation of the shift lever 30 is positioned at the upper portion, the length and the shift stroke of the shift knob 20 are reduced, thereby solving the problem in the related art.

In addition, the engaging lever 40 is installed to rotate in a direction opposite to the shift lever 30 when the shift lever 30 rotates. This is to allow the operational direction of the shift lever 30 with the operational direction of the engaging lever 40 to be matched.

That is, as the center point of rotation is located at the upper portion, when the transmission cable C is connected to the lower portion of the shift lever 30, the manipulative direction of the shift knob 20 and operational direction of the transmission cable C become to be opposite to each other. At this time, the engaging lever 40 may be connected to the lower portion of the shift lever 30 and the transmission cable C may be connected to the engaging lever 40. Thus, when the shift lever 30 is rotated by the manipulation of the shift knob 20, the engaging lever 40 is rotated in a direction opposite to the shift lever 30, whereby the transmission cable C is shifted in a direction the same as the shift knob 20. Accordingly, it is possible to apply the cable connection structure of the existing transmission to the shift lever structure according to the present disclosure.

As shown in FIGS. 3 to 4, the shift lever 30 and the engaging lever 40 may be connected through a connecting portion 50 configured to simultaneously perform a rotational movement and a sliding movement.

That is, the shift lever 30 and the engaging lever 40 are rotatably connected to each other, wherein the shift lever 30 and the engaging lever 40 are rotated in opposite directions to each other. In addition, the shift lever 30 and the engaging lever 40 are connected to each other by the medium of the connecting portion 50 so that the rotational clearance generated between rotations of the shift lever 30 and the engaging lever 40 may be absorbed. Therefore, when the shift lever 30 and the engaging lever 40 are rotated, the connecting portion 50 may simultaneously perform a rotational movement and a sliding movement so that the shift lever 30 and the engaging lever 40 may be rotated in conjunction with each other.

When described in detail with respect to the connecting portion 50, the connecting portion 50 includes a guide part 51 provided with a slit hole 52 extending in a straight line and a guide pin 53 rotatably inserted into the slit hole 52, wherein the guide part 51 and the guide pin 53 are provided on the shift lever 30 and the engaging lever 40, respectively, and the shift lever 30 and the engaging lever 40 may be connected by the medium of the guide part 51 and the guide pin 53.

In this way, the connecting portion 50 includes the guide part 51 and the guide pin 53, and the guide part 51 and the guide pin 53 are installed separately in the shift lever 30 and the engaging lever 40, respectively.

For example, in the case that the guide part 51 is coupled to the shift lever 30 and the guide pin 53 is coupled to the engaging lever 40, when the shift lever 30 is rotated by the manipulation of the shift knob 20, the engaging lever 40 is rotated along with the shift lever 30 by the medium of the guide pin 53 inserted into the slit hole 52 of the guide part 51. At this time, the guide pin 53 slides in the slit hole 52 of the guide part 51, thereby allowing the clearance according to the rotations, in the opposite directions, of the shift lever 30 and the engaging lever 40 to be absorbed.

In addition, the lever ratio of the shift knob 20 may be adjusted depending on a state whether the guide part 51 and the guide pin 53 are provided on the shift lever 30 and the engaging lever 40 or the engaging lever 40 and the shift lever 30, respectively. In addition, the lever ratio of the shift knob 20 may also be adjusted by the extension direction and the extension length of the slit hole 52. Here, the lever ratio is for the shift stroke of the shift knob 20, and may be a rotation angle of the shift knob 20 required to shift when the shift knob 20 is shifted to each shift stage.

On the other hand, the guide pin 53 may include a body portion 53a fixed to the shift lever 30 or the engaging lever 40, and a ball part 53b extending from the body portion 53a and inserted into the slit hole 52.

As shown in FIG. 4, the guide pin 53 includes the body portion 53a and the ball part 53b. In the case of the body portion 53a, a plurality of coupling parts 53a-1 may protrude not to be separated when coupled to the shift lever 30 or engaging lever 40. Meanwhile, the ball part 53b may be provided in a ball shape so as to be freely rotated in a state being inserted into the slit hole 52. Therefore, the guide pin 53 may simultaneously perform a rotational movement and a sliding movement in the state of being inserted into the slit hole 52 of the guide part 51.

On the other hand, the guide pin 53 may further include a cap part 54 provided to surround the ball part 53b and sliding into the slit hole 52 along with the ball part 53b in a state in close contact with the slit hole 52.

The cap part 54 may be made of a rubber material and is configured to remove the clearance between the ball part 53b and the slit hole 52 by being interposed between the ball part 53b and the slit hole 52. The cap part 54 described above may surround the ball part 53b inwardly, wherein the ball part 53b may be freely rotated. In addition, the outside of the cap part 54 may be brought in close contact with the slit hole 52 but may be lubricated to allow slippage thereof to occur. As a result, as the cap part 54 is provided between the ball part 53b and the slit hole 52, a collision sound by the clearance between the ball part 53b and the slit hole 52 is prevented from occurring. In addition, as the cap part 54 in a lubricated state is connected to the ball part 53b and the slit hole 52, the guide pin 53 is allowed to smoothly perform a rotational movement and a sliding movement.

On the other hand, the shift knob 20 may be connected to the shift lever 30 at a portion located upper than the center point of rotation, and the engaging lever 40 may be connected to the shift lever 30 at another portion located lower than the center point of rotation.

In addition, the engaging lever 40 has an intermediate portion 40a rotatably installed in the lever body 10, one end portion 40b extending to the upper side from the intermediate portion 40a is connected to the shift lever 30, and the transmission cable C may be connected to an opposite end portion 40c extending to the lower side from the intermediate portion 40a.

Figure 5:
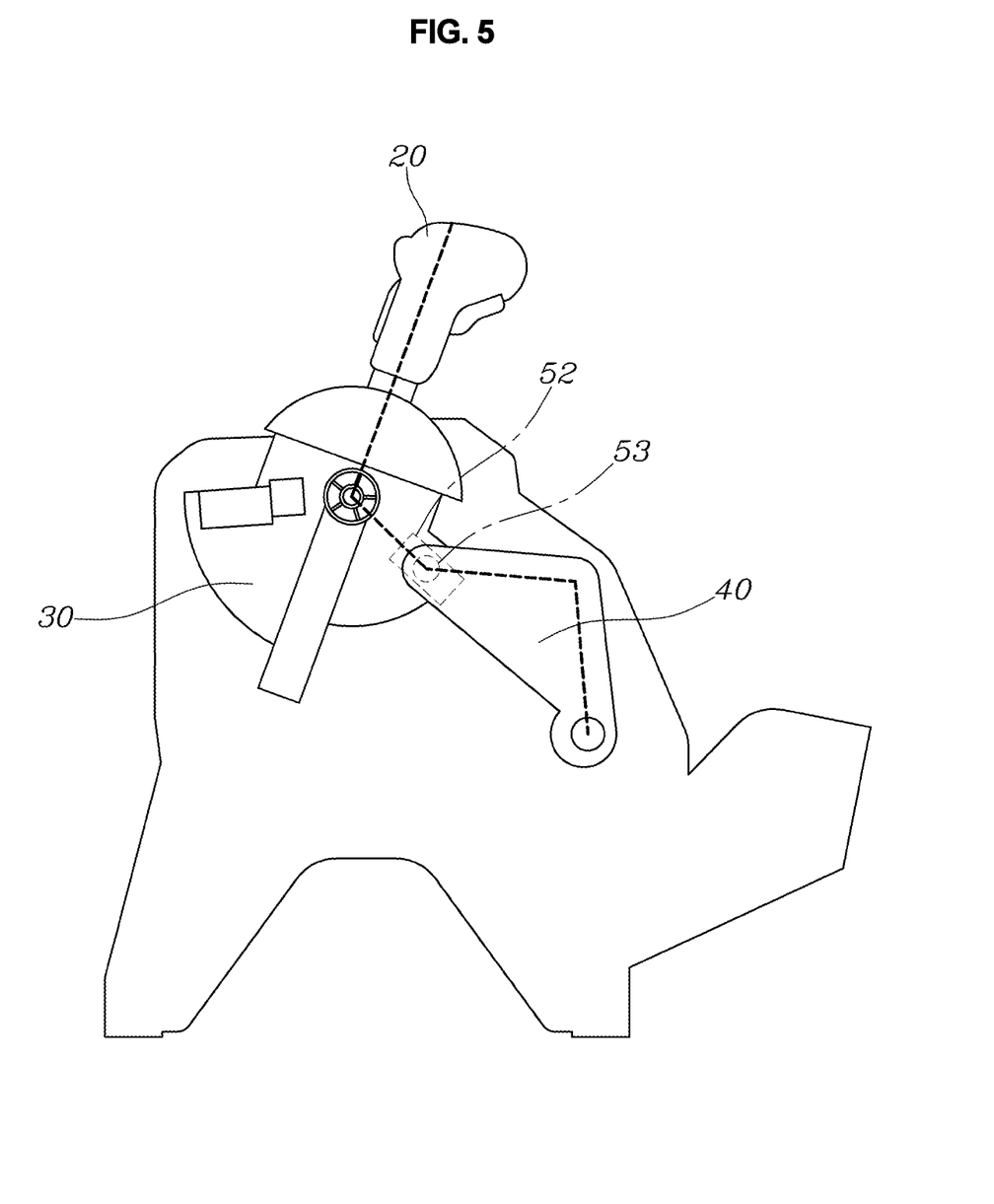
FIGS. 5 to 12 are views illustrating the operating states of the shift lever apparatus for the vehicle shown in FIG. 1.

Therefore, as shown in FIG. 5, when the shift knob 20 is manipulated, the shift lever 30 is rotated with the shift knob 20 in the counterclockwise direction (the right direction in the drawing) with the center point of rotation as the reference. As the one end portion 40b is connected to the shift lever 30 by the medium of the connecting portion 50, the engaging lever 40 is rotated in a clockwise direction (left direction of the drawing) opposed to the shift lever 30. At this time, as the transmission cable C is connected to the opposite end portion 40c of the engaging lever 40, the transmission cable C is moved in the clockwise direction the same as the manipulative direction of the shift knob 20.

In this way, with the center point of rotation as the reference, the shift knob 20 is connected to the upper side of the shift lever 30, and the one end 40b of the engaging lever 40 is connected to the lower side of the shift lever 30. Here, through a structure in which the transmission cable C is connected to the opposite end portion 40c, the manipulative direction of the shift knob 20 and the operational direction of the transmission cable C may be matched.

On the other hand, as shown in FIG. 2, the shift knob 20 may be provided with a round cover 60 that is rotated along with the shift lever 30 and provided to be bent with a radius corresponding to a rotational radius of the shift lever 30. In this way, the round cover 60 provided to be bent may be smoothly rotated without interfering with the lever body 10 during the manipulation of the shift knob 20.

The above-mentioned round cover 60 is a cover shape surrounding a top end of the shift lever 30, is provided with a fastening portion 61 to which the shift knob 20 is coupled, and may be provided with protrusions 62 extending along the curved portions on opposite sides. As shown in FIG. 13, the shift knob 20 may be connected to the shift lever 30 through the fastening portion 61 of the round cover 60, and as the round cover 60 covers the shift lever 30, external contaminants are not allowed to enter a side of the shift lever 30. In addition, as the protrusions 62 are provided extending on opposite sides of the round cover 60, foreign materials introduced from the outside are guided by the protrusion 62 of the round cover 60, thereby avoiding the shift lever 30. As a result, the shift lever 30 is prevented from being contaminated by foreign materials, whereby durability thereof is maintained.

Meanwhile, as shown in FIG. 13, a bezel 70 disposed at an upper portion of the round cover 60 is provided on a top side of the lever body 10, wherein the bezel 70 is provided with a bent portion 71 extending toward an inward side of the protrusion 62 of the round cover 60, wherein the bent portion 71 may be spaced apart from the top surface and the protrusion 62 of the round cover 60.

As such, as the bezel 70 is provided at the top side of the lever body 10, the round cover 60 is not excessively exposed so that the design is not inhibited, and the bezel 70 primarily prevents foreign materials from inflowing. In addition, the bezel 70 is provided with the bent portion 71 extending to an inward side of the protrusion 62 of the round cover 60, so that foreign materials inflowing through the bezel 70 may be guided to be discharged avoiding the shift lever 30 after inflowing into an inward side of the protrusion 62 of the round cover 60. Here, the bent portion 71 is spaced apart from the top surface and the protrusion 62 of the round cover 60 so that interference does not occur in the rotation of the round cover 60.

On the other hand, as shown in FIG. 14, the shift knob 20 is connected so as to traverse the center line of rotation of the shift lever 30 vertically at the right angle. Accordingly, the rotational trajectory of the shift knob 20 according to the manipulation of the shift knob 20 may be reflected in the rotational trajectory of the shift lever 30 so that the shift lever 30 may have the same rotational trajectory as the shift knob 20.

A description with respect to the operation of the present disclosure described above is as follows.

Figure 6:
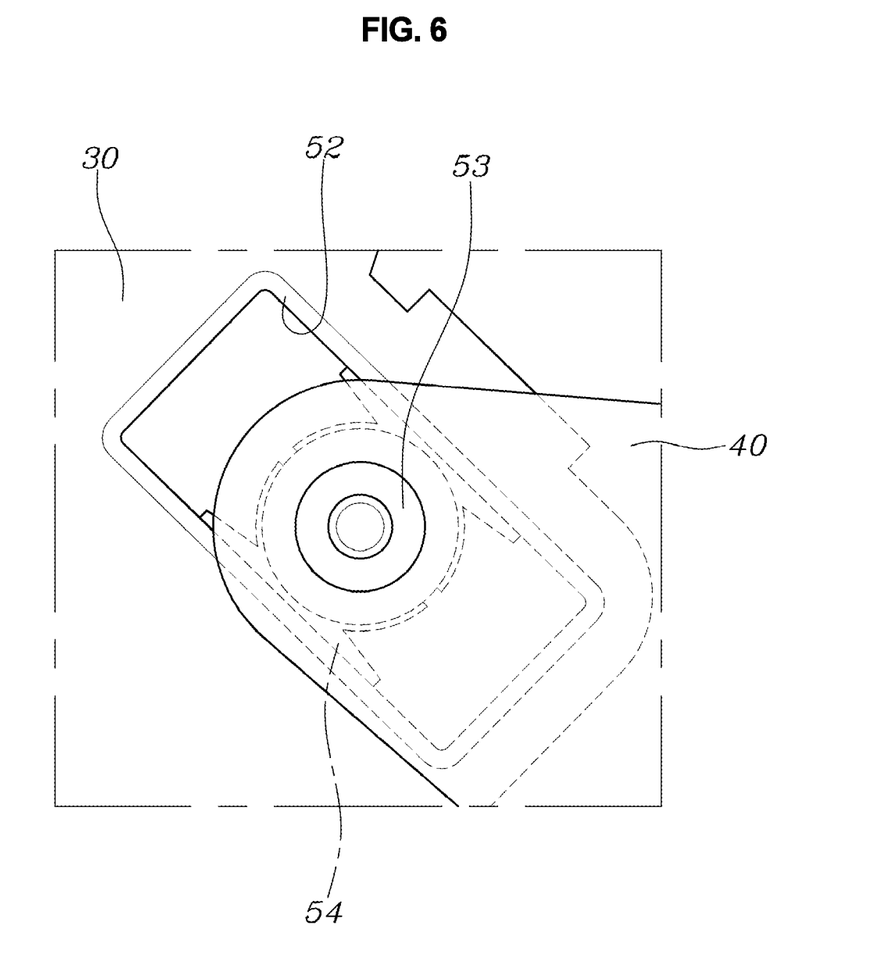

FIG. 5 illustrates rotational positions of the shift lever 30 and the engaging lever 40 when the shift knob 20 selects the shift stage P, and FIG. 6 illustrates the position of the guide pin 53 in the slit hole 52 of the guide part 51 in the state where the shift knob 20 selects the shift stage P.

Figure 7:
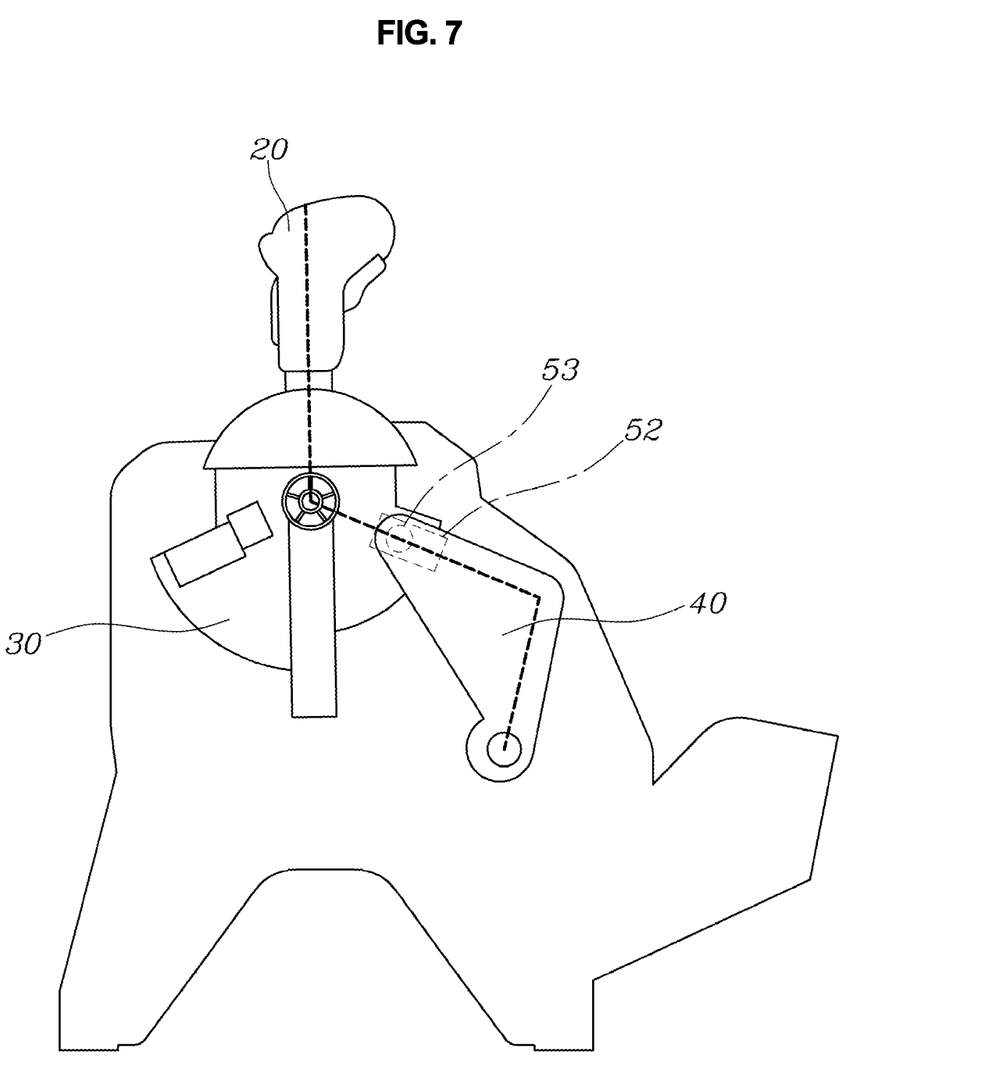
Figure 8:
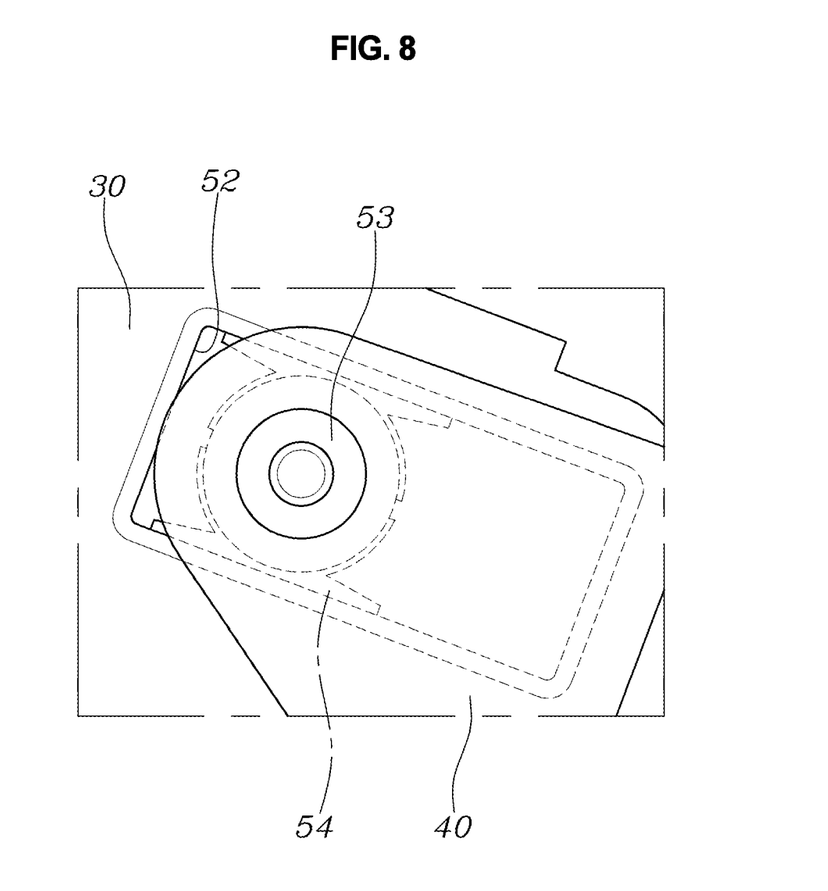

Here, when the shift knob 20 is switched to the shift stage R, as shown in FIG. 7, as the shift lever 30 and the engaging lever 40 are rotated, the connecting portion 50 is moved upward. In this case, as shown in FIG. 8, the guide pin 53 constituting the connecting portion 50 is slid and moved while rotating in the slit hole 52 of the guide part 51. Thus, the shift lever 30 and the engaging lever 40 are rotated in conjunction with each other, and the clearance therebetween is absorbed, whereby a smooth operational relationship thereof is established.

Figure 9:
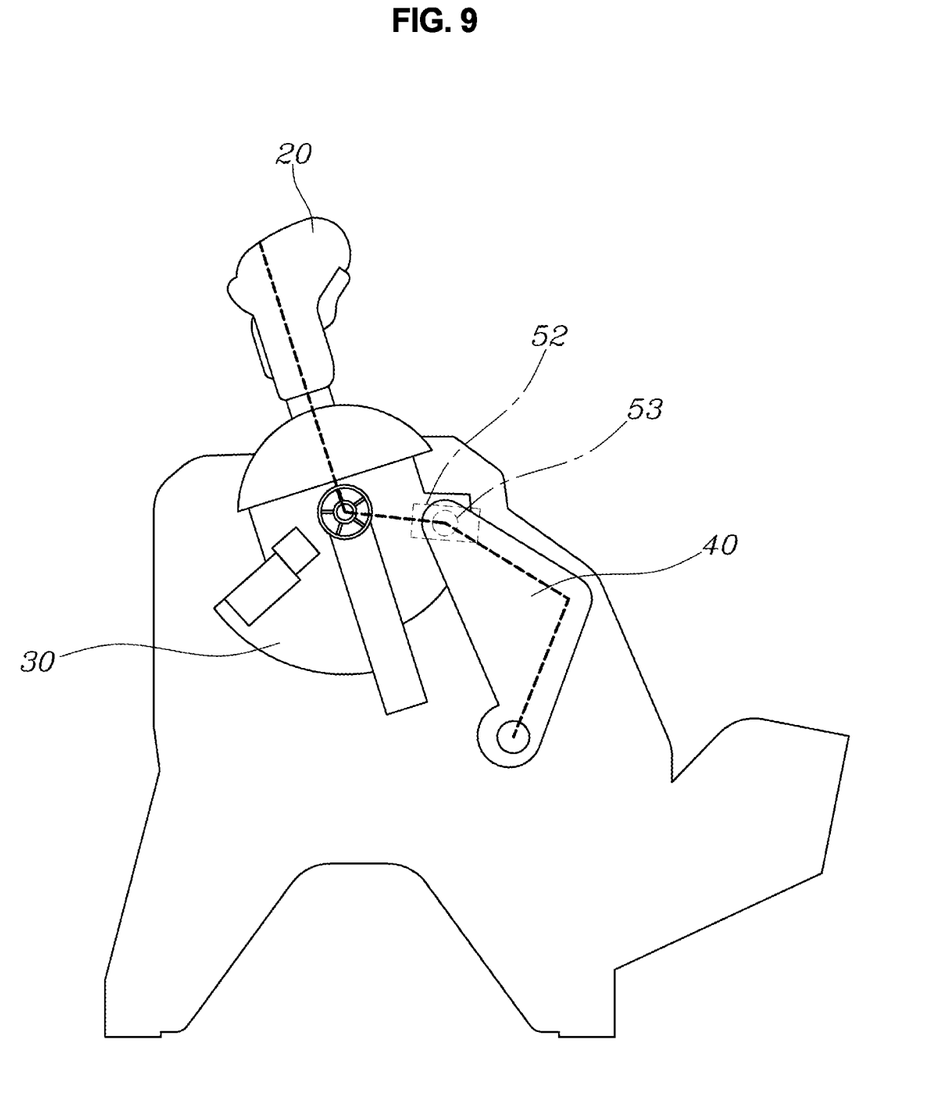
Figure 10:
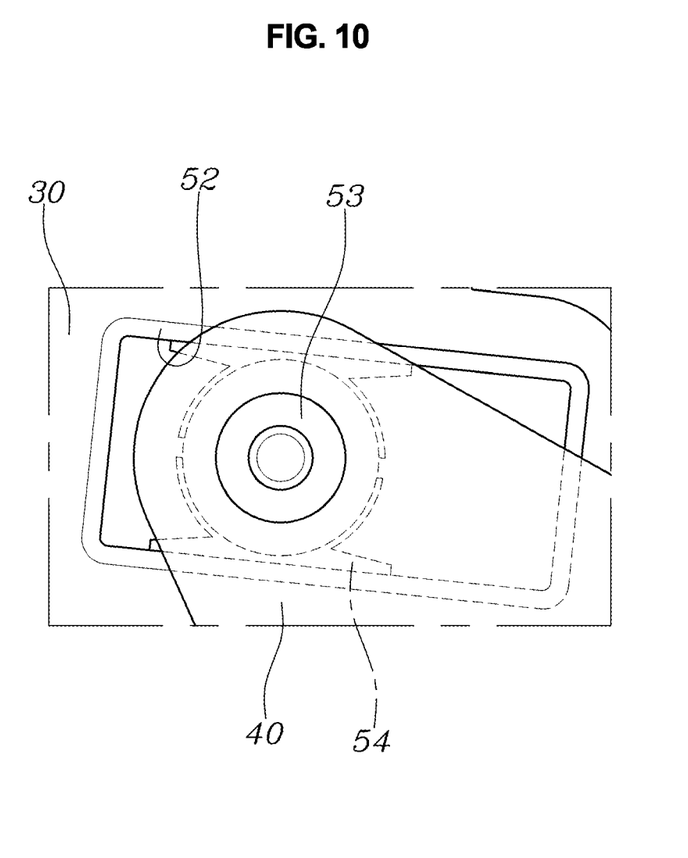

Herethrough, when the shift knob 20 is switched to the shift stage N, as shown in FIGS. 9 to 10, being in conjunction with the manipulation of the shift knob 20, the rotational movement and the sliding movement of the connecting portion 50 are performed simultaneously with the rotation of the shift lever 30 and the engaging lever 40. In addition, when the shift knob 20 is switched to the shift stage D, as shown in FIGS. 11 to 12, the rotation of the shift lever 30 and the engaging lever 40 and the rotational movement and the sliding movement of the connecting portion 50 may be performed.

The shift lever apparatus for the vehicle having the structure as described above moves the center point of rotation of the shift knob 20 upward whereby the height of the shift knob 20 exposed to the console and the operating stroke of the shift knob 20 are reduced, thereby reducing the console size and allows the manipulation direction of the shift knob and the operational direction of the transmission cable to be matched, whereby a connection structure of the existing transmission may be maintained.

While the present disclosure has been shown and described with respect to particular embodiments, it will be self-evident for those of ordinary knowledge that various changes and modifications may be made therein without departing from the spirit of the present disclosure.

What is claimed is:

1. A shift lever apparatus for a vehicle, the apparatus comprising:
   a shift knob connected to a shift lever rotatably installed in a lever body, the shift lever configured to have a center point of rotation at an upper portion of the shift lever; and
   an engaging lever installed in the lever body and configured to rotate along with the shift lever coupled to the engaging lever,
   wherein:
      the engaging lever is connected to a transmission cable and configured to rotate in a direction opposite to a manipulation direction of the shift lever when rotated, such that the manipulation direction of the shift lever is the same as an operational direction of the transmission cable,
      the shift lever and the engaging lever are connected through a connecting portion configured to simultaneously perform a rotational movement and a sliding movement,
      the connecting portion includes:
         a guide part provided with a slit hole extending in a straight line; and
         a guide pin rotatably inserted into the slit hole, and
      the guide part and the guide pin are provided on the shift lever and the engaging lever, respectively, and the shift lever and the engaging lever are connected by the guide part and the guide pin.

2. The apparatus of claim 1, wherein the guide pin includes: a body portion fixed to the shift lever or the engaging lever, and a ball part extending from the body portion and inserted into the slit hole.

3. The apparatus of claim 2, wherein the guide pin further includes: a cap part configured to surround the ball part and slide into the slit hole along with the ball part in a state in contact with the slit hole.

4. The apparatus of claim 1, wherein the shift knob is connected to the shift lever at a first portion located above the center point of rotation, and the engaging lever is connected to the shift lever at a second portion located lower than the center point of rotation.

5. The apparatus of claim 4, wherein the engaging lever includes:
   an intermediate portion rotatably installed in the lever body;
   a first end portion extended from the intermediate portion toward an upper side of the engaging lever, the first end portion connected to the shift lever; and
   a second end portion extended from the intermediate portion toward a lower side of the engaging lever, the second end portion connected to the transmission cable.

6. The apparatus of claim 1, wherein the shift knob is connected so as to traverse the center point of rotation of the shift lever vertically at a right angle.

7. A shift lever apparatus for a vehicle, the apparatus comprising:
   a shift knob connected to a shift lever rotatably installed in a lever body, the shift lever configured to have a center point of rotation at an upper portion of the shift lever; and
   an engaging lever installed in the lever body and configured to rotate along with the shift lever coupled to the engaging lever,
   wherein:
      the engaging lever is connected to a transmission cable and configured to rotate in a direction opposite to a manipulation direction of the shift lever when rotated, such that the manipulation direction of the shift lever is the same as an operational direction of the transmission cable,
      the shift lever is provided with a round cover configured to rotate along with the shift lever,
      the round cover is configured to surround a top end of the shift lever, and the round cover includes: a fastening portion to which the shift lever is coupled, and protrusions extending along curved portions formed on opposite sides of the round cover, and
   wherein a bezel disposed at an upper portion of the round cover is provided on a top side of the lever body, the bezel being provided with a bent portion extending toward an inward side of each protrusion of the protrusions of the round cover, and wherein the bent portion is spaced apart from a top surface and the protrusions of the round cover.

\* \* \* \* \*